(No Model.)

T. B. SWAN.
DEVICE FOR FEEDING AND WATERING HOGS.

No. 376,489. Patented Jan. 17, 1888.

Witnesses,

Inventor,
Thomas B. Swan

UNITED STATES PATENT OFFICE.

THOMAS B. SWAN, OF ATLANTIC, IOWA.

DEVICE FOR FEEDING AND WATERING HOGS.

SPECIFICATION forming part of Letters Patent No. 376,489, dated January 17, 1888.

Application filed August 30, 1887. Serial No. 248,326. (No model.)

*To all whom it may concern:*

Be it known that I, THOMAS B. SWAN, a citizen of the United States, residing at the city of Atlantic, in the county of Cass and State of Iowa, have invented a new and useful Device for Watering and Feeding Hogs, of which the following is a specification.

The objects of my invention are to provide a device for watering and feeding hogs which will prevent hogs when eating or drinking from the same from crowding or pushing each other from the food and drink; also, to provide a device for watering and feeding hogs from which the hogs can ordinarily readily eat and drink, but which can be closed when desired, so that the hogs cannot eat or drink from the same; also, a device for watering and feeding hogs, having the opening in the top of the vessel protected in such a manner that the hogs cannot place their feet into or lie down in the vessel; also, a device for watering and feeding hogs, having a receiver through which food and drink can be readily conveyed into the vessel when it is closed, so that hogs cannot eat or drink from the same as well as when it is open, and also a device for watering and feeding hogs the vessel of which can be easily cleaned. I attain these objects by the device illustrated in the accompanying drawings, in which—

Figure 2:
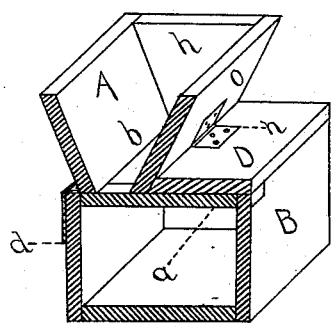
Figure 4:
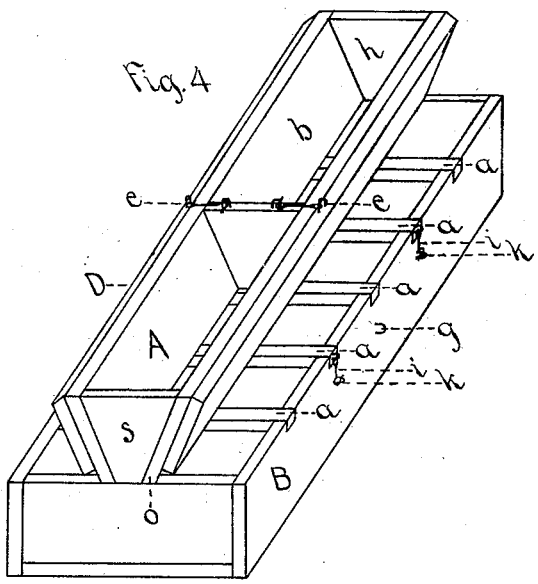
Figure 1:
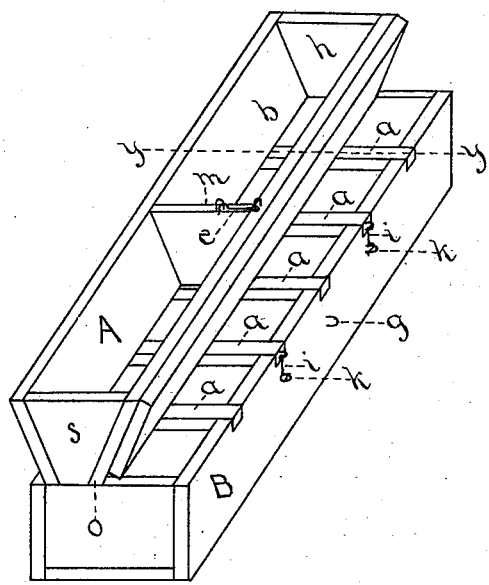
Figure 3:
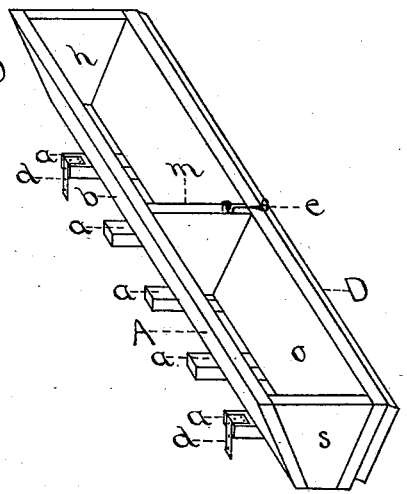

Figure 1 is a perspective view of the device. Fig. 2 is a cross-section of a part of the device on the line $y\ y$, Fig. 1. Fig. 3 is a perspective view of the device, excepting the vessel. Fig. 4 is a perspective view of a modified form of the device.

Similar letters refer to similar parts throughout the several views.

The device consists of the vessel or trough B, the cross-bars $a$, one or more of which are hinged at one end and hasped at the other end to the vessel, the cover D, and the receiver A, which is firmly secured to the cross-bars.

The vessel B is an ordinary trough. The receiver A is open at its top and base, and is composed of the sides $b$ and $o$, the ends $s$ and $h$, and the division $m$. The cover D is hinged to the receiver, and is provided with a hasp, $e$, which hooks into a staple in the division $m$ and holds the cover against the receiver, as shown in Figs. 1 and 4. By unhooking the hasp the cover can be turned down onto the cross-bars, as shown in Fig. 2, when the hasp can be hooked into the staple $g$ in the side of the vessel. When food or drink is put into the receiver, it passes through it into the vessel.

The cross-bars should be a sufficient distance apart to allow hogs to easily put their heads between them. The cross-bars and receiver prevent hogs from crowding or pushing each other from the food or drink and from placing their feet into or lying down in the vessel. When the cover is turned down upon the cross-bars, as shown in Fig. 2, it prevents the hogs from eating or drinking from the vessel.

If desired, the receiver can be placed longitudinally near the center of the trough and the trough made of sufficient width to allow the hogs to eat or drink from the vessel when standing upon either side of the same, as shown in Fig. 4.

One or more of the cross-bars are secured at one end to the vessel by the hasps $i$, which enter the staples $k$, and at the other end by the hinges $d$. It is evident when the hasps are unhooked from the staples in the vessel that the bars can be moved upon the hinges, and that the bars and receiver and cover can be moved from over the vessel, leaving it entirely uncovered and in a suitable condition to be easily cleaned.

I am aware that feed-troughs have been made which were provided with hoppers and hinged covers, also troughs which were provided with cross-bars, and therefore I do not broadly claim such feed-troughs as my invention; but What I do claim as my invention, and desire to secure by Letters Patent, is—

The herein-described device for watering and feeding hogs, consisting of the vessel, the receiver, the covers hinged to the receiver, and the cross-bars hinged at one end and hasped at the other end to the vessel and each firmly secured to the lower portion of the receiver, the parts being constructed, combined, and arranged substantially as shown and described.

THOMAS B. SWAN.

Witnesses:
WALTER ROBERTS,
JAMES PUGH.